United States Patent
Chhibber et al.

(10) Patent No.: US 10,735,989 B2
(45) Date of Patent: Aug. 4, 2020

(54) MULTI-PATH TCP OVER DUAL NETWORKS

(71) Applicant: ATC Technologies, LLC, Reston, VA (US)

(72) Inventors: Sachin Chhibber, Ashburn, VA (US); Santanu Dutta, Vienna, VA (US)

(73) Assignee: ATC TECHNOLOGIES, LLC, Reston, VA (US)

(*) Notice: Subject to any disclaimer, the term of this patent is extended or adjusted under 35 U.S.C. 154(b) by 0 days.

(21) Appl. No.: 15/998,431

(22) Filed: Aug. 16, 2018

(65) Prior Publication Data
US 2019/0059018 A1     Feb. 21, 2019

Related U.S. Application Data

(60) Provisional application No. 62/546,344, filed on Aug. 16, 2017.

(51) Int. Cl.
*H04W 28/02* (2009.01)
*H04W 80/06* (2009.01)
(Continued)

(52) U.S. Cl.
CPC ...... *H04W 28/0231* (2013.01); *H04B 17/336* (2015.01); *H04L 45/24* (2013.01);
(Continued)

(58) Field of Classification Search
CPC . H04W 28/0231; H04W 28/06; H04W 80/06; H04W 84/06; H04L 45/24; H04B 17/336
See application file for complete search history.

(56) References Cited

U.S. PATENT DOCUMENTS 6,141,329 A    10/2000 Turner
6,567,662 B1    5/2003 Swanchara, III et al.
(Continued)

FOREIGN PATENT DOCUMENTS

EP    1072132    11/2001
EP    1309105    5/2003
(Continued)

OTHER PUBLICATIONS

PCT/US2018/000222 International Search Report and Written Opinion dated Oct. 29, 2018 (17 pages).

*Primary Examiner* — Rasheed Gidado
(74) *Attorney, Agent, or Firm* — Michael Best & Friedrich LLP

(57) ABSTRACT

Systems and methods for simultaneous multi-path TCP data flows over a plurality of transport paths, such as satellite and terrestrial networks. One system enables the plurality of paths to be used for increasing the end-to-end transport reliability or throughput of the network, depending on the prevailing reliabilities of the paths. One method includes determining, with a first electronic processor, a first reliability for a first network path configured to carry a first data stream, and a second reliability for a second network path configured to carry a second data stream. The method includes transmitting the first and second reliabilities to a second electronic processor. The method includes receiving a selected mode based on the first and second reliabilities, said mode indicating whether the plurality of paths are being used to enhance reliability or throughput. The method includes receiving the first and second data streams, and processing the first and second data streams based on the selected mode. The method includes determining the relative delays between the plurality of paths and equalizing the (Continued)

delays through buffering, which may be performed either at the transmitter, the receiver or both.

19 Claims, 5 Drawing Sheets

(51) Int. Cl.
*H04W 28/06* (2009.01)
*H04L 12/707* (2013.01)
*H04B 17/336* (2015.01)
*H04W 84/06* (2009.01)

(52) U.S. Cl.
CPC ............ *H04W 28/06* (2013.01); *H04W 80/06* (2013.01); *H04W 84/06* (2013.01)

(56) References Cited

U.S. PATENT DOCUMENTS

| | | | | |
|---|---|---|---|---|
| 8,427,948 B2 * | 4/2013 | Ivanov | ................ | H04L 65/4069 370/231 |
| 8,660,482 B2 | 2/2014 | Burr | | |
| 9,344,478 B2 * | 5/2016 | Chen | ................... | H04N 21/4126 |
| 9,774,539 B1 * | 9/2017 | Jia | ........................... | H04L 47/26 |
| 10,067,842 B2 * | 9/2018 | Puranik | ................ | G06F 11/2017 |
| 2003/0060195 A1 | 3/2003 | Dent | | |
| 2006/0193295 A1 * | 8/2006 | White | ................. | H04L 12/5692 370/336 |
| 2007/0117506 A1 | 5/2007 | Park et al. | | |
| 2008/0307291 A1 * | 12/2008 | Hoffman | ............... | H04W 28/06 714/784 |
| 2009/0156227 A1 | 6/2009 | Frerking et al. | | |
| 2013/0028247 A1 * | 1/2013 | Li | ........................... | H04L 45/24 370/338 |
| 2015/0011159 A1 | 1/2015 | Marinov et al. | | |
| 2016/0261756 A1 | 9/2016 | Altman | | |
| 2016/0337254 A1 * | 11/2016 | Karaki | ................. | H04L 47/283 |

FOREIGN PATENT DOCUMENTS

| | | |
|---|---|---|
| EP | 1231723 | 6/2005 |
| EP | 1569363 | 11/2008 |
| WO | WO199838754 | 9/1998 |
| WO | WO199953660 | 10/1999 |
| WO | WO2001033666 | 5/2001 |

* cited by examiner

US 10,735,989 B2

MULTI-PATH TCP OVER DUAL NETWORKS

RELATED APPLICATIONS

This application claims priority to U.S. Provisional Patent Application No. 62/546,344, filed Aug. 16, 2017, the entire content of which is hereby incorporated by reference.

FIELD

Embodiments described herein relate to satellite and terrestrial wireless communications systems and, more particularly, to providing multi-path TCP transmission modes.

SUMMARY

User terminals or devices, for example, smart telephones and data terminals, may connect to and interact with other devices and applications via satellite networks. However, satellite connections may not always be available, for example, due to poor signal penetration through areas cluttered with natural and artificial blockages (e.g., trees or buildings). To address this concern, according to some current solutions, user terminals or devices may connect to either satellite or terrestrial networks to provide data connections via multiple redundant transmission paths that can backup each other. However, maintaining session continuity during a switchover between the paths may be problematic due to packet loss that occurs before (for example, when a connection is beginning to degrade) and during the switchover. Connecting to satellite and terrestrial networks simultaneously is also problematic. In addition, because of the greater latency of satellite networks relative to that of terrestrial networks, packets sent over the terrestrial network will arrive earlier than those sent over the satellite network.

Accordingly, embodiments described herein provide, among other things, systems and methods for simultaneous multi-path TCP data flows over satellite and terrestrial networks. Embodiments presented herein provide systems that can automatically transition from multimode (satellite and terrestrial) to single mode (satellite or terrestrial) transmission without the need for the transmitter to inform the receiver of the mode switch, where mode refers to the choice of transmission path. Embodiments provided herein maintain session continuity when transitioning from a terrestrial network to a satellite network, or vice versa. Embodiments herein also provide increased user throughput and data reliability when connecting to both satellite and terrestrial networks.

One exemplary embodiment provides a method for providing multi-path network connections. The method includes determining, with a first electronic processor, a first reliability for a first network path configured to carry a first data stream. The method includes determining, with the first electronic processor, a second reliability for a second network path configured to carry a second data stream. The method includes transmitting, with the first electronic processor, the first reliability and the second reliability to a second electronic processor. The method includes receiving, from the second electronic processor, a selected mode based on the first reliability and the second reliability. The method includes receiving, from the second electronic processor, the first data stream. The method includes receiving, from the second electronic processor, the second data stream. The method includes processing, with the first electronic processor, the first data stream and the second data stream based on the selected mode.

Another exemplary embodiment provides a network system. The system includes a first network path configured to carry a first data stream, a second network path configured to carry a second data stream, a receiving electronic device, and a transmitting electronic device. The receiving electronic device includes a first electronic processor. The transmitting electronic device includes a second electronic processor, and is communicatively coupled to the receiving electronic device via the first network path and the second network path. The first electronic processor is configured to determine a first reliability for the first network path. The first electronic processor is configured to determine a second reliability for the second network path. The first electronic processor is configured to transmit, to the transmitting device, the first reliability and the second reliability. The first electronic processor is configured to receive, from the transmitting device, a selected mode. The first electronic processor is configured to receive, from the transmitting device, the first data stream. The first electronic processor is configured to receive, from the transmitting device, the second data stream. The first electronic processor is configured to process, the first data stream and the second data stream based on the selected mode. The second electronic processor is configured to determine the selected mode based on the first reliability and the second reliability. The second electronic processor is configured to transmit the first data stream and the second data stream based on the selected mode.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
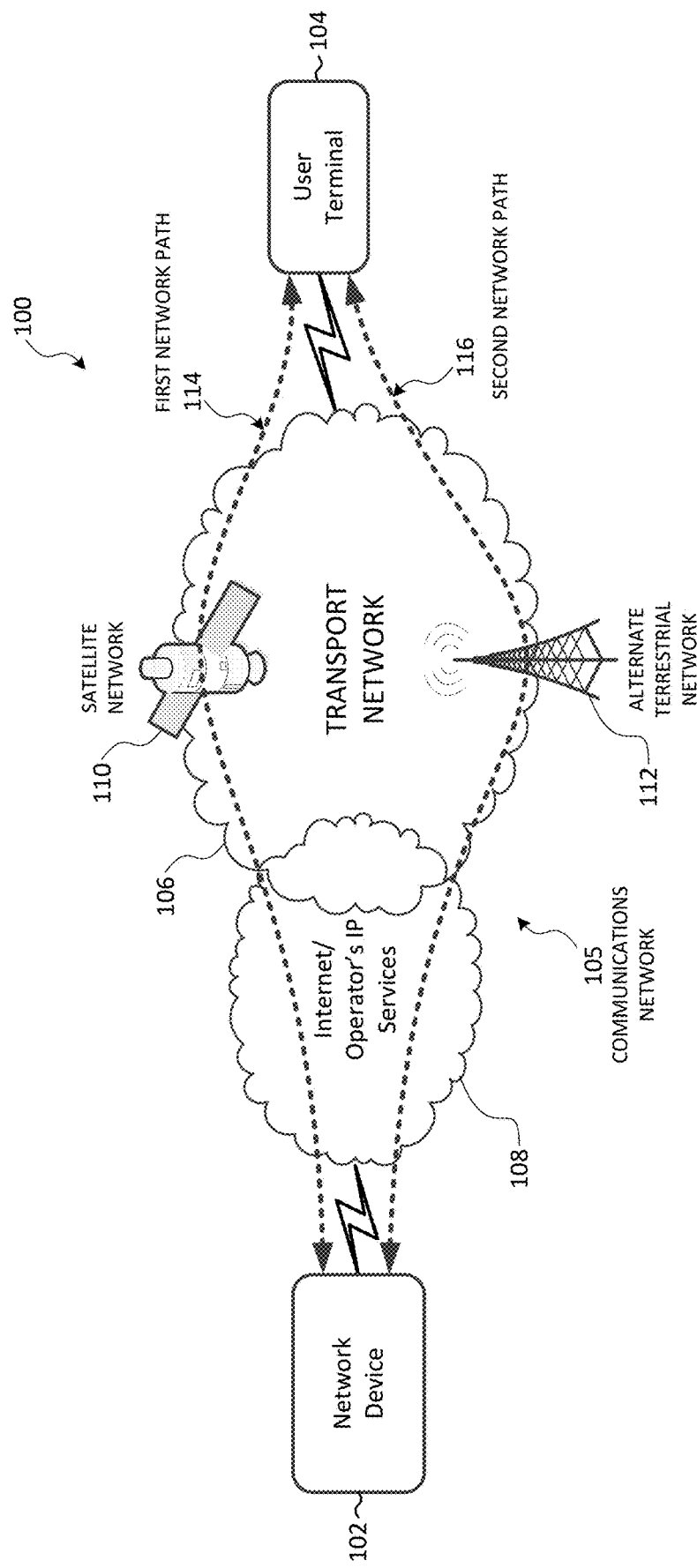
FIG. 1 is a diagram of a network system according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any exemplary embodiments of the invention are explained in detail, it is to be understood that the invention is not limited in its application to the details of construction and the arrangement of components set forth in the following description or illustrated in the following drawings. The invention is capable of other embodiments and of being practiced or carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronics based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components.

FIG. 1 is a diagram of an example network system 100. The system 100 includes a network device 102, a user terminal 104, and a communications network 105. It should be understood that the system 100 is provided as an example and, in some embodiments, the system 100 includes additional components. For example, the system 100 may include multiple network devices, multiple user terminals, or a combination thereof. In particular, it should be understood that although FIG. 1 illustrates a single user terminal 104, the system 100 may include tens, hundreds, thousands, or even more, user terminals.

The network device 102 and the user terminal 104 are communicatively coupled via a communications network 105. The communications network 105 is a telecommunications network that includes a transport network 106 and the internet (or portions thereof) or an operator's IP services network 108. The communications network 105 may be a wired or wireless network or networks, operating according to suitable Internet protocols (for example, Transmission Control Protocol (TCP), Internet Protocol (IP), and User Datagram Protocol (UDP)). The terms "internet protocol" and "internet protocols," as used herein, may refer to Internet Protocol version 4 (IPv4), Internet Protocol version 6 (IPv6), future-developed internet protocols, or some combination of the foregoing. All or parts of the communications network 105 may be implemented using one or more existing networks, for example, a cellular network, the Internet, a land mobile radio (LMR) network, a short-range (for example, Bluetooth™) wireless network, a wired or wireless wide area network (WAN), a wireless local area network (for example, Wi-Fi), and a public switched telephone network (PSTN). The communications network 105 may also include future-developed networks.

The transport network 106 is made up of at least two other networks, for example, a satellite network 110 and an alternate terrestrial network 112. The satellite network 110 transmits data between terrestrial devices (for example, the network device 102 and the user terminal 104) via one or more telecommunications satellites, for example as used in low-earth orbit (LEO), medium-earth orbit (MEO), and geosynchronous-orbit (GEO) systems.

The alternate terrestrial network 112 is an earth-based communications network including wireless and wired connections. The alternate terrestrial network 112 may be implemented using a wide area network, such as the Internet, a local area network, such as a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof.

The satellite network 110 provides a first network path 114 (a satellite network path) between the network device 102 and the user terminal 104. The alternate terrestrial network 112 provides a second network path 116 (a terrestrial network path) between the network device 102 and the user terminal 104. As described more particularly below, the network device 102 and the user terminal 104 may communicate with one another via one or both of the first network path 114 and the second network path 116.

Figure 2:
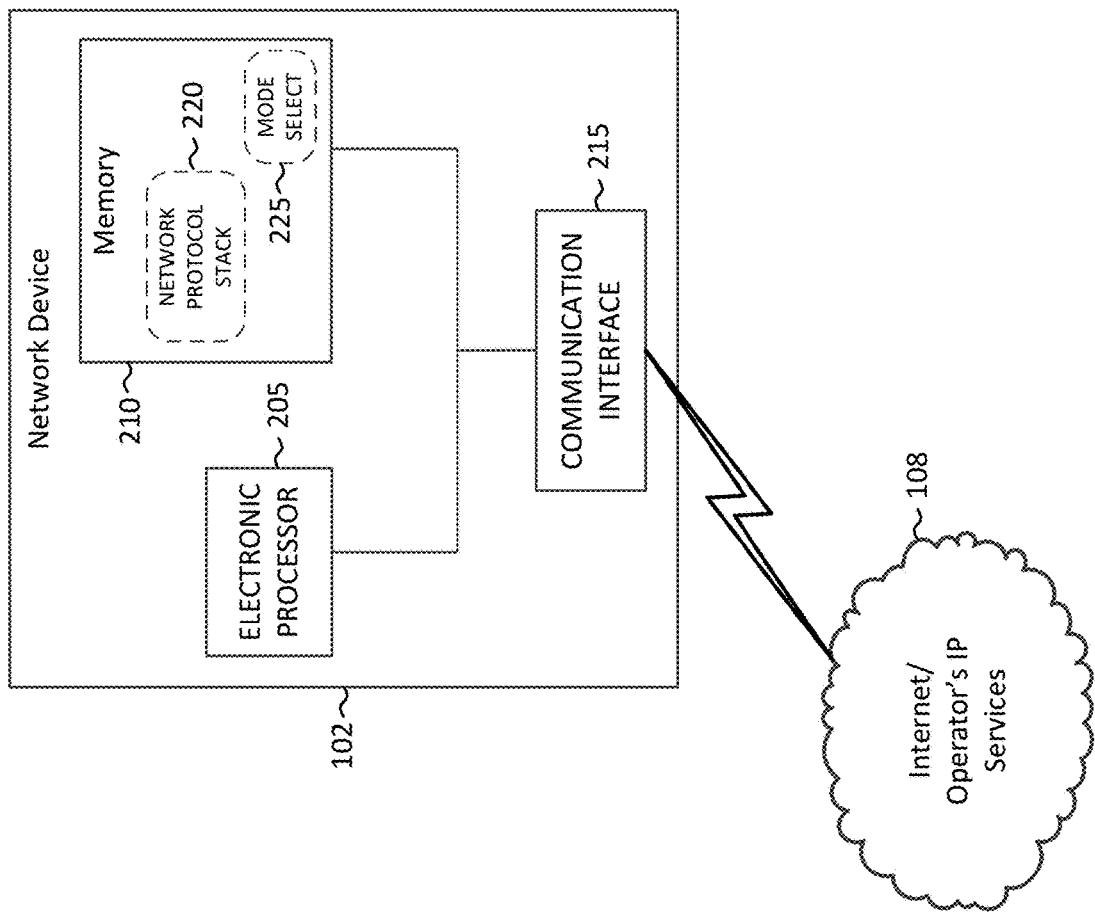
FIG. 2 is a diagram of the network device of the system of FIG. 1 according to some embodiments.

FIG. 2 illustrates an example of the network device 102. In the embodiment illustrated, the network device 102 includes an electronic processor 205, a memory 210, and a communication interface 215. The illustrated components, along with other various modules and components are coupled to each other by or through one or more control or data buses that enable communication therebetween.

The electronic processor 205 obtains and provides information (for example, from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. As used in the present application, "non-transitory computer-readable media" comprises all computer-readable media but does not consist of a transitory, propagating signal. The program storage area and the data storage area can include combinations of different types of memory, as described herein. In the embodiment illustrated, the memory 210 stores, among other things, network protocol stack 220, which comprises software instructions to execute the communication protocols corresponding to the first network path 114 and the second network path 116. As can be appreciated by one skilled in the art, the network protocol stack 220 may have a layered architecture, using layers specified by standards bodies such as Internet Engineering Task Force (IETF) and 3GPP. The memory 210 also stores a mode select function 225, which, as described more particularly below, determines how the network device 102 transmits data via one or both of the first network path 114 and the second network path 116.

The electronic processor 205 controls the communication interface 215 to send and receive data over the communications network 105 (for example, over the first network path 114, the second network path 116, or both). The communication interface 215 may include one or more wireless transmitters or transceivers for wirelessly communicating over the communications network 105 (via the satellite network 110, the alternate terrestrial network 112, or both). Alternatively, or in addition to wireless transmitters or transceivers, the communication interface 215 may include one or more ports for receiving cable, such as Ethernet cables, for communicating over the communications network 105 or dedicated wired connections. The components illustrated as being included in the network device 102 are sufficient to provide connectivity to the network device 102 over both the satellite network 110 and the alternate terrestrial network 112 simultaneously.

Figure 3:
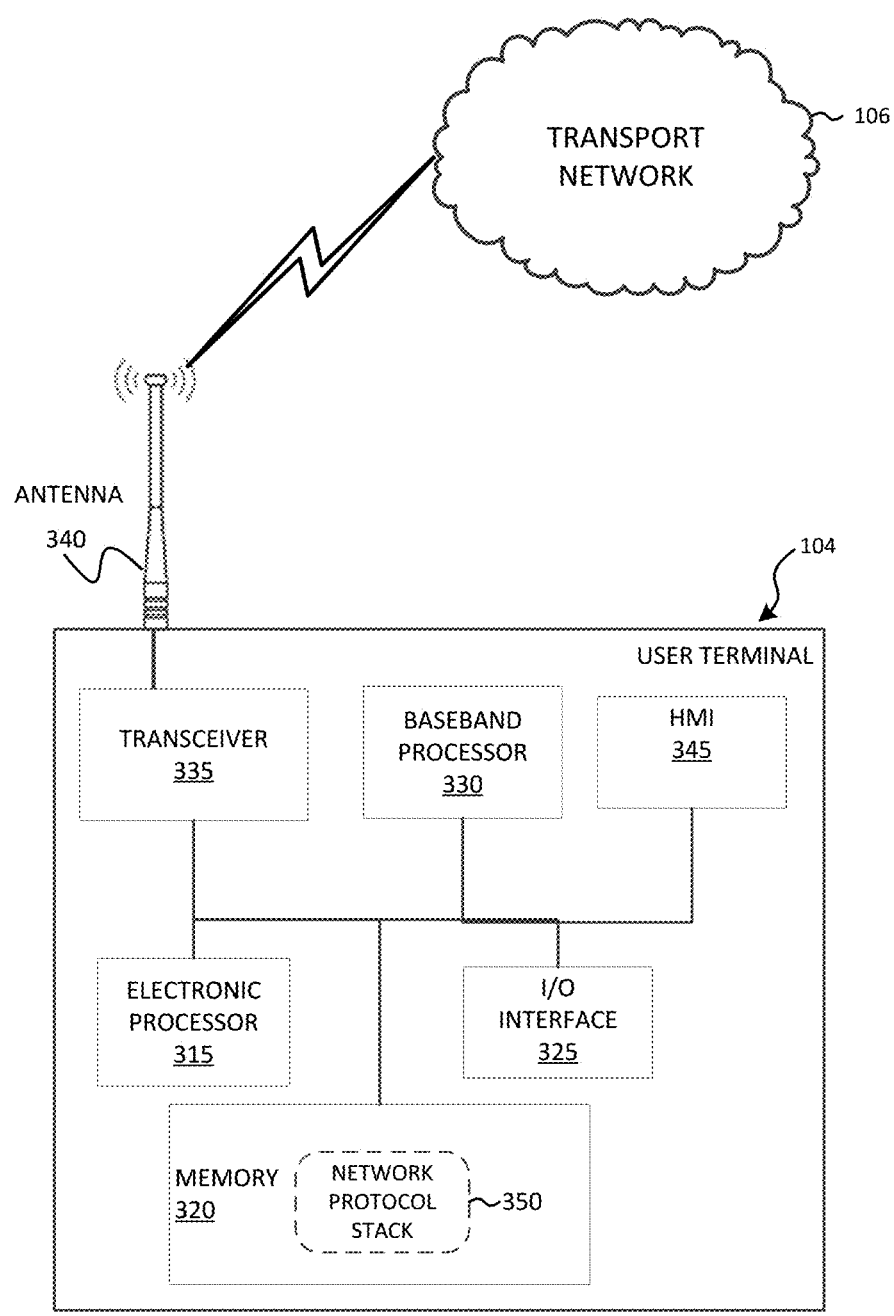
FIG. 3 is a diagram of the user terminal of the system of FIG. 1 according to some embodiments.

FIG. 3 illustrates an example user terminal 104. In the embodiment illustrated, the user terminal 104 includes an electronic processor 315, a memory 320, a communication interface 325, a baseband processor 330, a transceiver 335, an antenna 340, and a human machine interface (HMI) 345. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 315 obtains and provides information (for example, from and to the memory 320 and/or the communication interface 325), and processes the information by executing one or more software instructions or modules, capable of being stored, for example, in a random access memory ("RAM") area of the memory 320 or a read only memory ("ROM") of the memory 320 or another non-transitory computer readable medium (not shown). The software can include firmware, one or more applications, program data, filters, rules, one or more program modules, and other executable instructions. The electronic processor 315 is configured to retrieve from the memory 320 and execute, among other things, software related to the control processes and methods described herein.

The memory 320 can include one or more non-transitory computer-readable media, and includes a program storage area and a data storage area. As used in the present application, "non-transitory computer-readable media" comprises all computer-readable media but does not consist of a transitory, propagating signal. The program storage area and the data storage area can include combinations of different types of memory, as described herein. In the embodiment illustrated, the memory 320 stores, among other things, network protocol stack 350. The electronic processor 315 executes the network protocol stack 350, which operates according to internet protocols in a similar manner to that described above with regard to the network protocol stack 220.

The communication interface 325 is configured to receive input and to provide output. The communication interface 325 obtains information and signals from, and provides information and signals to, devices both internal and external to the user terminal 104 via, for example, one or more wired and/or wireless connections.

The electronic processor 315 is configured to control the baseband processor 330 and the transceiver 335 to transmit and receive data to and from the user terminal 104. The baseband processor 330 encodes and decodes digital data sent and received by the transceiver 335. The transceiver 335 transmits and receives radio signals to and from, for example, the transport network 106 (the satellite network 110, the alternate terrestrial network 112, or both) using the antenna 340. The electronic processor 315, the baseband processor 330, and the transceiver 335 may include various digital and analog components, which for brevity are not described herein and which may be implemented in hardware, software, or a combination of both. Some embodiments include separate transmitting and receiving components, for example, a transmitter and a receiver, instead of the transceiver 335. The components illustrated are sufficient to provide connectivity to the user terminal 104 over both the satellite network 110 and the alternate terrestrial network 112 simultaneously.

The human machine interface (HMI) 345 receives input from, and provides output to, users of the user terminal 104. The HMI 345 may include a keypad, switches, buttons, soft keys, indictor lights (for example, light emitting diodes (LEDs), haptic vibrators, a display (for example, a touch-screen), or the like. In some embodiments, the HMI 345 includes a suitable display such as, for example, a liquid crystal display (LCD) touch screen, or an organic light-emitting diode (OLED) touch screen. In such embodiments, the portable electronic device 102 implements a graphical user interface (GUI) (for example, generated by the electronic processor 315, from instructions and data stored in the memory 320, and presented on the display of the HMI 345), that enables a user to interact with and control the user terminal 104.

As noted above, the network device 102 and the user terminal 104 may communicate with one another via one or both of the first network path 114 and the second network path 116. The first network path 114 and the second network path 116 each have a reliability level (or metric), which may be the packet error rate on the network path or a proxy thereof. Accordingly, the network device 102, the user terminal 104, or both, may be configured to send data over the two paths based on the paths' respective reliability metrics, as described below.

Figure 4:
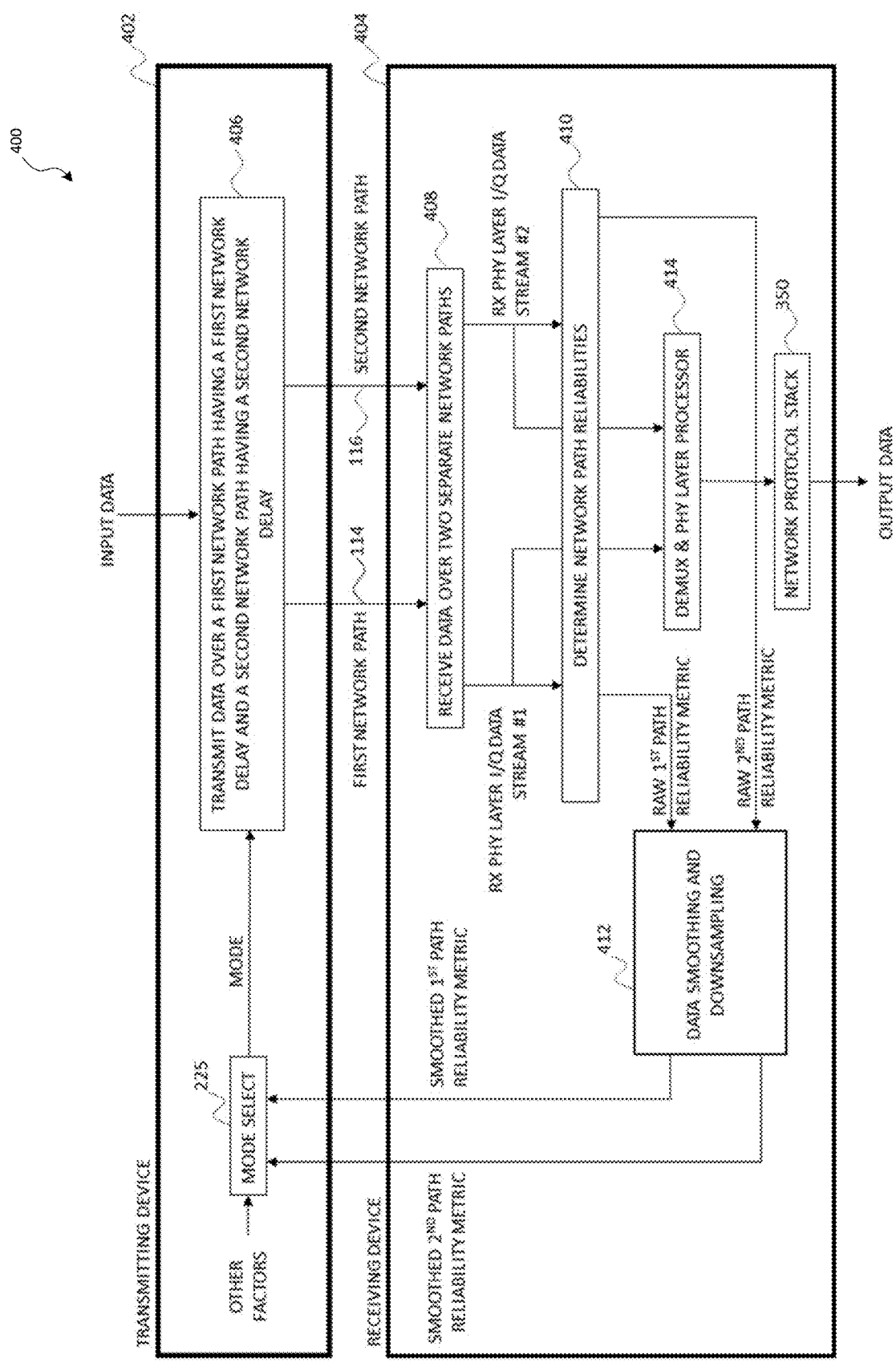
FIG. 4 is a process block diagram illustrating a method of operating the network system of FIG. 1 according to some embodiments.

FIG. 4 illustrates an example method 400 for providing multi-path TCP connections via the system 100. The method 400 is explained in terms of a transmitting device 402 (for example, the network device 102) sending data to a receiving device 404 (for example, the user terminal 104) via the first and second network paths 114 and 116. It should be noted that both the network device 102 and the user terminal 104 could operate as either the transmitting device 102 or the receiving device 104, depending on the direction of the data flow. FIG. 4 is a process block diagram, which illustrates the method 400 in terms of functions (for example, the mode select function 225), which may be implemented in hardware, software, or combinations of both. Although FIG. 4 is not provided to illustrate a specific hardware configuration, for ease of description, it also makes reference to hardware components (for example, the first and second network paths 114 and 116) of the system 100, as described above with respect to FIG. 1. An overview of the method 400 is provided first, followed by a more detailed description of the steps.

Overview of the Method 400

The availability of a plurality of redundant transport paths (for example, the first network path 114 and the second network path 116) may be used to either enhance data transport reliability (for example, through redundant transmission of the same packet on several paths), or enhance data throughput (for example, through multiplexed transmission of different packets on several paths). A combination of the two approaches may also be used, where the plurality of paths is used partially for redundant transmission and partially for multiplexing packet streams. At all times, the selected mode of the network—enhanced reliability or enhanced throughput—is known to both the transmitting device 402 and the receiving device 404. In the former mode, the transmitting device 402 sends the same packet on parallel transport paths. Additional delay may be added to the transport paths at the transmitting device 402, the receiving device 404, or both, to equalize the relative path delays at the receiving device 404. At the receiving device 404, the signals received on the multiple transport paths, (for example, satellite and terrestrial cellular paths), are subjected to measurements of parameters that are known to be indicators of channel reliability. Examples include carrier to noise spectral density ratio ($C/N_0$) and parity error check, among others.

Detailed Description of the Method 400

The method 400 is implemented by a transmitting device 402 (for example, the network device 102) and a receiving device 404 (for example, the user terminal 104). The transmitting device 402 receives input data, and transmits it to the receiving device 404. The transmitting device 402 transmits the input data using a transmission mode selected by the mode select function 225, as described more particularly below. The input data is used to generate two data streams, a first data stream and a second data stream. Depending on the selected mode, the data streams may be identical copies of the input data, or may each include multiplexed segments of the input data. The transmitting device 402 transmits the first and second data streams via the first and second network paths 114 and 116, respectively (at block 406). For example, radio transmitters of the communication interface 215 may generate radio signals on the first and second network paths 114 and 116.

The receiving device 404 includes a multimode receiver function 408, which receives the radio signals from the transmitting device 402, and frequency translates the two radio signals to separate streams of complex baseband (I/Q) signals. The electronic processor of the receiving device 404 analyzes the complex baseband signals to determine the reliability metrics for the network paths, by taking appropriate measurements (at block 410). In some embodiments, such measurements include: the output $C/N_0$ as determined by carrier tracking phase locked loops, parity errors in the demodulated data from each stream, zero crossing errors in the symbol synchronizer, and the like. Some of these measurements may vary rapidly with time, fluctuating rapidly relative to the received packet duration. Accordingly, in some embodiments, to increase the reliability of the measurements for use in determining network path reliability metrics, it is desirable to subject them to appropriate time averaging, where the averaging time constant may be chosen to be long relative to a packet duration but short relative to the typical rate of change of the reliability of the channels. In such embodiments, time averaging is performed by a data smoothing and down-sampling function 412. In a digital signal processing implementation, the down-sampling is performed to match the sampling rate to the bandwidth of the sampled signal—in the present case, as smoothing would have reduced the signal bandwidth, a reduction of the sampling rate is appropriate. The reduction in sampling rate also reduces the capacity load on the return link. It is noteworthy that the system is still carrying two separate reliability metrics corresponding to the two paths. These smoothed reliability metrics are communicated back to the transmitting device 402 using the best return link channel—there is no need to send each metric on the channel to which it pertains.

In addition to being used to determine network path reliability metrics, the complex baseband (I/Q) signals from the two network paths are fed to a demux and physical layer processor 414. The demux and physical layer processor 414 may be implemented as a dedicated hardware component, or as a software function of the electronic processor of the receiving device 404. Each of the two data signals on the two transport paths also carries a control channel component (multiplexed in the frequency, time, or code domains) that indicates the selected mode of the network. It should be clear that the same mode information is repeated on the control channel components of the two paths. The demux and physical layer processor 414 reads the mode parameter separately in each of the data streams and uses the one that has the higher reliability, as indicated by block 410. The demux and physical layer processor 414 will select the more reliable data stream if the mode is enhanced reliability, and multiplexes the two data stream onto a single stream of double the rate if the mode is enhanced throughput. The output of the demux and physical layer processor 414 is fed to the upper layers of the network protocol stack 350, for further processing and output.

In the example illustrated, the mode select function 225 is performed by the transmitting device 402. In some embodiments, the mode select function 225 is performed by the receiving device 404, which communicates the mode status to the transmitting device 402. This has the advantage of reducing the traffic load on the return link but there may be application—driven reasons to have the mode select function performed by the transmitting device 402.

Regardless of the operating mode, the transmitting device 402 is transmitting two data streams via both the first network path 114 and the second network path 116. The first network path 114 and the second network path 116 each have a network latency (that is, a time delay observed as data is transmitting over the network from one end point to another). In some embodiments, the first network path 114 has a delay that is greater than a delay for the second network path 116, because of the greater latency of satellite networks relative to that of terrestrial networks. For example, the end-to-end delay of a geosynchronous satellite network is approximately 300 ms (250 ms of propagation delay and approximately 50 ms of processing delay). In contrast, the end-to-end delay of terrestrial LTE may be less than 100 ms. As a consequence, packets sent over the second network path 116 will arrive earlier than those sent over the first network path 114. Accordingly, the transmitting device 402, the receiving device 404, or both, may be configured to synchronize the data received over the two paths, as described below.

Figure 5:
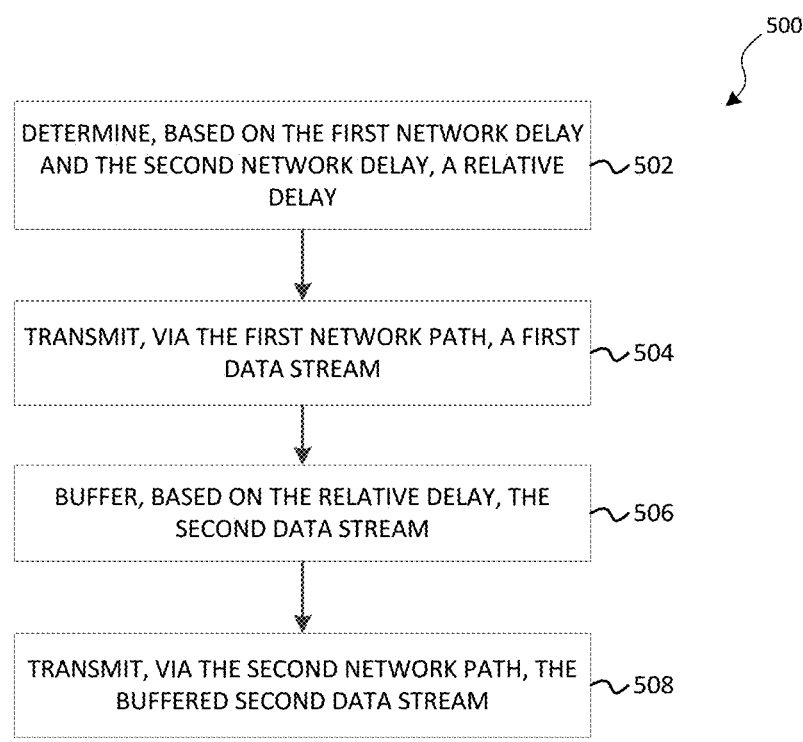
FIG. 5 is a flow chart illustrating a method of operating the network system of FIG. 1 according to some embodiments.

FIG. 5 illustrates an example method 500 for providing multi-path TCP connections via the system 100. The method 500 is described as being performed by either the transmitting device 402 or the receiving device 404 and, in particular, their respective electronic processors. Note that, as above, the roles of transmitting and receiving are interchangeable between the network device 102 and user terminal 104 depending on the direction of the data flow. It should be understood that, in some embodiments, portions of the method 500 may be performed by other computing devices. As an example, the method 500 is described in terms of a single network device 102 communicating with a single user terminal 104. The embodiments of the method 500 may be implemented across multiple network devices and user terminals. The method steps set forth below are described as being performed by an electronic processor (which may be the electronic processor 205, the electronic processor 315, or both) that is connected to a communication interface (which may be the communication interface 215 or the communication interface 325, depending on which electronic processor is performing the method step).

At block 502, the electronic processor determines, based on the first network delay and the second network delay, a relative delay. The relative delay represents the difference between the two delays. For example, when the first network delay is 300 ms and the second network delay is 100 ms, the relative delay is 200 ms.

At block 504, the electronic processor in the transmitting device 402 transmits (for example, over a communication interface), to the first network path 114, a first data stream. The first data stream includes, for example, a series of TCP packets. In one embodiment, at block 506, the electronic processor in the in the transmitting device 402 buffers, based on the relative delay, a second data stream prior to transmission. The second data stream also includes a series of TCP packets. For example, the electronic processor may temporarily store the packets to be transmitted in a data storage device (a digital shift register, a read/write memory element, or both) for a time equivalent to the relative delay determined at block 502. At block 508, the electronic processor in the transmitting device 402 transmits (for example, via a communication interface), to the second network path 116, the buffered second data stream. By buffering the second data stream, it appears to the receiving device 404 that the data streams are synchronized and that the packets from both network paths arrive nearly simultaneously. This allows for, among other things, an application to choose packets received over either path without having to search back in time.

By delaying transmission at the transmitting device 402, the receiving device 404 does not need to cope with the delay difference between the network paths. In some embodiments, buffering may be implemented in the receiving device 404. The receiving device 404 delays, based on the relative delay, the reception of data streams on the second network path 116. In some embodiments, introducing the additional relative delay in the second network path 116 may be split between the transmitting device 402 and the receiving device 404. In such embodiments, the electronic processor may determine, based on the relative delay, a transmit relative delay and a receive relative delay. For example, when the relative delay is 200 ms, the transmit relative delay may be set to 100 ms and the receive relative delay may be set to 100 ms. By delaying transmission of a data stream by 100 ms at one device and buffering a received data stream for 100 ms at another device, the entire 200 ms relative delay is accounted for, but the load for accomplishing this is split between devices. In some embodiments, the split may include buffering completely at the transmitting device 402, so that no buffering is required at the receiving device 404.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A method for providing multi-path network connections, the method comprising:
   determining, with a first electronic processor, a first reliability for a first network path configured to carry a first data stream;
   determining, with the first electronic processor, a second reliability for a second network path configured to carry a second data stream;
   transmitting, with the first electronic processor, the first reliability and the second reliability to a second electronic processor;
   receiving, with the first electronic processor from the second electronic processor, a selected mode based on the first reliability and the second reliability;
   transmitting, with the second electronic processor to the first electronic processor, the first data stream and the second data stream based on the selected mode;
   receiving, with the first electronic processor from the second electronic processor, the first data stream;
   receiving, with the first electronic processor from the second electronic processor, the second data stream; and
   processing, with the first electronic processor, the first data stream and the second data stream based on the selected mode.

2. The method of claim 1, further comprising:
   when the first reliability and the second reliability exceed a reliability threshold,
   selecting, with the second electronic processor, an enhanced throughput mode as the selected mode; and
   wherein transmitting the first data stream and the second data stream based on the selected mode includes transmitting data in the first data stream that differs from data in the second data stream.

3. The method of claim 1, further comprising:
   when either of the first reliability and the second reliability do not exceed a reliability threshold,
   selecting, with the second electronic processor, an enhanced reliability mode as the selected mode; and
   wherein transmitting the first data stream and the second data stream based on the selected mode includes transmitting identical data in the first data stream and the second data stream.

4. The method of claim 1, wherein determining the first reliability and the second reliability includes determining the first reliability and the second reliability by performing at least one of the group consisting of checking parity among parity bits in the first data stream, checking parity among parity bits in the second data stream, estimating a carrier-to-noise-spectral-density ratio of a received signal for the first network path, and estimating a carrier-to-noise-spectral-density ratio of a received signal of the second network path.

5. The method of claim 1, further comprising:
   time averaging the first reliability and the second reliability to determine a first smoothed reliability and a second smoothed reliability; and
   determining the selected mode based on the first smoothed reliability and the second smoothed reliability.

6. The method of claim 1, further comprising:
determining, with the second electronic processor, based on a first network delay for a first network path and a second network delay for a second network path, a relative delay; and
buffering, based on the relative delay, the data stream having the greater delay.

7. The method of claim 6, wherein the buffering is performed by at least one of the group consisting of the first electronic processor and the second electronic processor.

8. The method of claim 6, further comprising:
buffering the second data stream with a data storage device selected from the group consisting of a digital shift register and a memory element.

9. The method of claim 1, wherein
determining the first reliability for the first network path includes determining the first reliability for a satellite network path; and
determining the second reliability for the second network path includes determining the second reliability for a terrestrial network path.

10. A network system comprising:
a first network path configured to carry a first data stream;
a second network path configured to carry a second data stream;
a receiving electronic device including a first electronic processor, and
a transmitting electronic device, including a second electronic processor, and communicatively coupled to the receiving electronic device via the first network path and the second network path,
wherein the first electronic processor is configured to
determine a first reliability for the first network path;
determine a second reliability for the second network path;
transmit, to the transmitting device, the first reliability and the second reliability,
receive, from the transmitting device, a selected mode,
receive, from the transmitting device, the first data stream;
receive, from the transmitting device, the second data stream; and
process the first data stream and the second data stream based on the selected mode, and
wherein the second electronic processor is configured to
determine the selected mode based on the first reliability and the second reliability; and
transmit the first data stream and the second data stream based on the selected mode.

11. The system of claim 10, wherein the second electronic processor is configured to:
when the first reliability and the second reliability exceed a reliability threshold,
select an enhanced throughput mode as the selected mode; and
transmit the first data stream and the second data stream based on the selected mode by transmitting data in the first data stream that differs from data in the second data stream.

12. The system of claim 10, wherein the second electronic processor is configured to:
when either of the first reliability and the second reliability do not exceed a reliability threshold,
select an enhanced reliability mode as the selected mode; and
transmit the first data stream and the second data stream based on the selected mode by transmitting identical data in the first data stream and the second data stream.

13. The system of claim 10, wherein the first electronic processor is configured to:
determine the first reliability and the second reliability by performing at least one of the group consisting of checking parity among parity bits in the first data stream, checking parity among parity bits in the second data stream, estimating a carrier-to-noise-spectral-density ratio of a received signal for the first network path, and estimating a carrier-to-noise-spectral-density ratio of a received signal of the second network path.

14. The system of claim 10, wherein the first electronic processor is configured to:
time average the first reliability and the second reliability to determine a first smoothed reliability and a second smoothed reliability; and
determine the selected mode based on the first smoothed reliability and the second smoothed reliability.

15. The system of claim 10, wherein the second electronic processor is configured to:
determine, based on a first network delay for a first network path and a second network delay for a second network path, a relative delay; and
buffer, based on the relative delay, the second data stream.

16. The system of claim 10, wherein the first electronic processor is configured to:
buffer the second data stream based on a relative delay.

17. The system of claim 15, wherein
the second electronic processor is configured to buffer the second data stream by buffering the second data stream for a transmit relative delay;
the first electronic processor is configured to buffer the second data stream for a receive relative delay; and
the sum of the transmit relative delay and the receive relative delay is equivalent to the relative delay.

18. The system of claim 15, wherein the second electronic processor is configured to:
buffer the second data stream with a data storage device selected from the group consisting of a digital shift register and a memory element.

19. The system of claim 10, wherein
the first network path is a satellite network path; and
the second network path is a terrestrial network path.

* * * * *